Jan. 4, 1949.    V. E. BABCOCK    2,458,047
BACK LASH PREVENTER FOR FISHING REELS
Filed July 9, 1946    2 Sheets-Sheet 1

Inventor
Verner E. Babcock.

By Clarence A. O'Brien
and Harvey B. Jacobson
Attorneys

Jan. 4, 1949. V. E. BABCOCK 2,458,047
BACK LASH PREVENTER FOR FISHING REELS
Filed July 9, 1946 2 Sheets-Sheet 2

Inventor
Verner E. Babcock.

By Clarence A. O'Brien
and Harvey B. Jacobson
Attorneys

Patented Jan. 4, 1949

2,458,047

UNITED STATES PATENT OFFICE 2,458,047

BACKLASH PREVENTER FOR FISHING REELS

Verner E. Babcock, Oak Harbor, Ohio

Application July 9, 1946, Serial No. 682,345

2 Claims. (Cl. 242—84.5)

1

This invention relates to new and useful improvements and structural refinements in fishing reels, more specifically, to improvements on my Patent No. 2,341,073, issued February 8, 1944, the latter in turn, being an improvement on my Patent No. 2,257,521, issued September 30, 1941.

While experimenting with back lash preventers constructed in accordance with my earlier patents, I have found that the same lend themselves to certain improvements, particularly insofar as the attachment thereof to the fishing reel is concerned. It is therefore, the principal object of the present invention to provide a device of the character herein described, in which such improvements are incorporated.

A further object of the present invention is to provide a back lash preventer which incorporates in its construction means for adjusting the pressure which it exerts upon the wound fishing line.

Another object of the invention is to provide a back lash preventer which is equally suitable for use on new fishing reels, or alternatively, as an attachment for reels already in existence.

An additional object of the invention is to provide a back lash preventer which is simple in construction and operation and which cannot easily become damaged.

A still further object of the invention is to provide a back lash preventer which will readily lend itself to economical manufacture.

With the above more important objects in view and such other objects as may become apparent as this specification proceeds, the invention consists essentially of the arrangement and construction of parts as illustrated in the accompanying drawings, in which.

Like characters of reference are used to designate like parts in the specification and throughout the several views.

Figure 1:
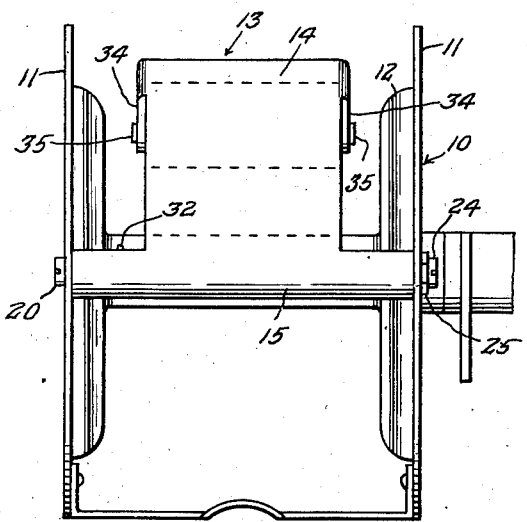
Figure 1 is a rear elevational view of the fishing reel, showing the invention in situ thereon.

Referring now to the accompanying drawings in detail, the invention is adapted for application to a fishing reel designated generally by the reference character 10, the same being of more or less conventional design and including in its construction a pair of spaced parallel side plates 11, forming a housing for a rotatable spool 12.

The essence of the invention resides in the provision of the back lash preventer designated generally by the reference character 13, the same embodying in its construction an arcuate plate 14, at one end of which is formed a tubular enclosure 15. This enclosure may be formed integrally with the plate, or if desired, the end portion of the plate may be suitably arcuated and secured to a tube, such as would provide the enclosure above referred to.

Rotatably positioned in each end portion of the enclosure 15 are a pair of cylindrical bushings 16, 17, the former being provided with an axially extending bore 18 and one end portion of this bore being screw-threaded as at 19, to receive the shank of a mounting screw 20.

The threaded end portion of the bushing 16 is reduced in diameter to provide a concentric boss 21, this being receivable in an aperture 22 formed in one of the aforementioned side plates 11. It will be noted that in this manner, the bushing 16 may be rigidly secured against the inner surface of said side plate, as is best shown in the accompanying Figure 4.

The bushing 17 is provided with a blind, screw-threaded bore 23 to receive the shank of a mounting screw 24, the latter also carrying a lock nut 25. Like the bushing 16, the bushing 17 is also formed with a concentric boss 26 which is receivable in an aperture 27 provided in the remaining side plate 11. It should be understood that the apertures 22, 27 are axially aligned, whereby the bushings 16, 17 will be disposed in alignment at the relatively opposed surfaces of the plates.

It will be observed that in the foregoing manner, the plate 14 will be pivotally connected, so to speak, to the reel 10, and the bushing 17 is also provided with a stem 28 which extends axially through the enclosure 15 and rotatably engages the bore 18 of the bushing 16.

Figure 4:
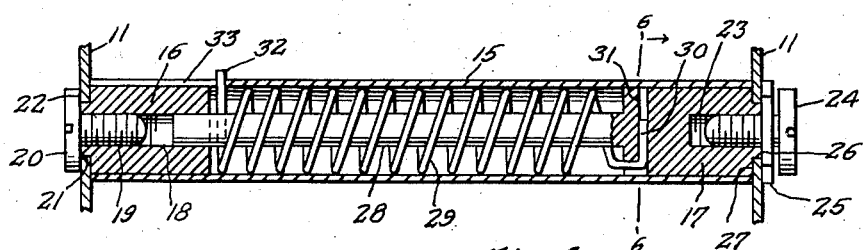
Figure 4 is a cross sectional view, taken substantially in the plane of the line 4—4 in Figure 3.

A coil spring 29 is positioned in the enclosure 15 intermediately of the bushings 16, 17 and surrounds the stem 28, as illustrated in Figure 4. One end portion 30 of the spring 29 is anchored in a transversely extending aperture 31 provided in the bushing 17, while the remaining end portion 32 of the spring engages a longitudinally extending slot 33 formed in the enclosure 15.

Figure 5:
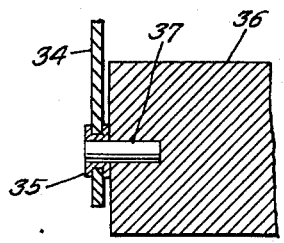
Figure 5 is a cross sectional view, taken substantially in the plane of the line 5—5 in Figure 3.
Figure 3:
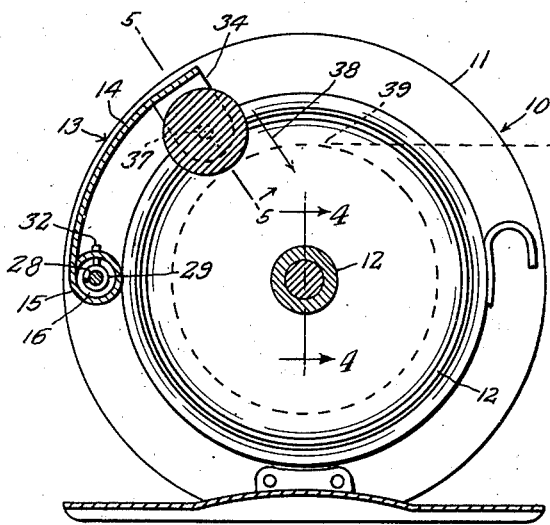
Figure 3 is a cross sectional view, taken substantially in the plane of the line 3—3 in Figure 2.
Figure 2:
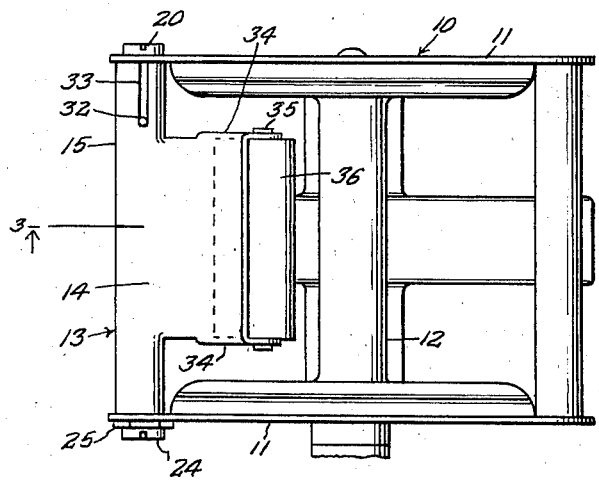
Figure 2 is a top plan view thereof.
Figure 6:
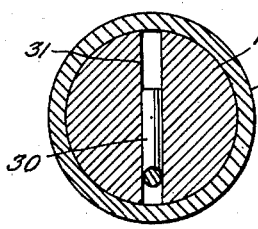
Figure 6 is a cross sectional view, taken substantially in the plane of the line 6—6 in Figure 4.

The remaining end portion of the plate 14 is formed to provide a pair of spaced, downturned ears 34, the same being equipped with a pair of axially aligned bearings 35, as is best shown in the accompanying Figure 5. A roller 36 is provided in the ends thereof with the mounting pins 37, the latter being rotatable in the bearings 35, whereby the roller is mounted upon the plate 14.

When the invention is placed in use, the spring 29 will normally urge the plate 14 together with the associated roller 36 in the direction of the arrow 38, whereby the roller will be caused to engage the fishing line 39 wound upon the spool 12. It will be noted that in this manner, the roller will effectively prevent back lash action in the fishing line, such as is commonly encountered when casting.

The pressure exerted by the roller 36 upon the wound fishing line may be regulated as desired, by simply loosening the lock nut 25 and rotating the bushing 17 with respect to the enclosure 15, to either increase or decrease the resiliency of the spring 29.

It is believed that the advantages and use of the invention will be clearly understood from the foregoing disclosure, and accordingly, further description thereof at this point is considered unnecessary.

What I claim as my invention is:

1. An attachment for fishing reels comprising in combination, a plate formed with a tubular enclosure at one end thereof, mounting means comprising a pair of bushings rotatably engaging the end portions of said enclosure, one of said bushings being formed with an axial bore, a stem on the remaining of said bushings rotatably engaging said bore, a coil spring positioned in said enclosure and surrounding said stem, one end of said spring being anchored to one of said bushings, the remaining end of said spring engaging said enclosure, said bushing associated with said spring being rotatably adjustable with respect to said enclosure, and a roller rotatably mounted at the remaining end of said plate, said roller engaging the wound fishing line.

2. The device as defined in claim 1 together with means for locking said adjustable bushing against rotation, said adjustable bushing being formed with a screw threaded bore, and said means comprising a locking screw provided on the fishing reel and engaging said bore.

VERNER E. BABCOCK.

REFERENCES CITED

The following references are of record in the file of this patent:

UNITED STATES PATENTS

| Number | Name | Date |
|---|---|---|
| 699,763 | Mathews | May 13, 1902 |
| 866,060 | Pflueger | Sept. 17, 1907 |
| 2,257,521 | Babcock | Sept. 30, 1941 |